S. C. SMITH.
Winding Click of Watches.
No. 138,350.             Patented April 29, 1873.
Fig. 1.
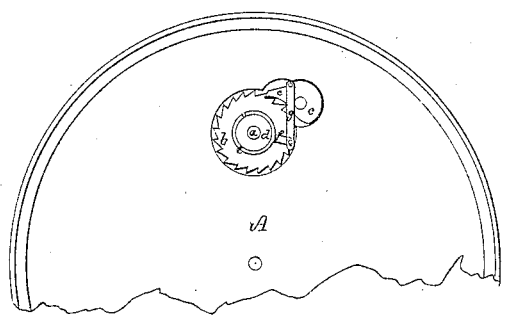
Fig. 3.
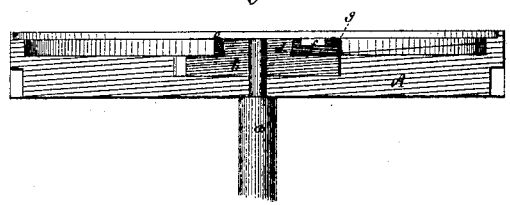
Fig. 4.        Fig. 2.        Fig. 5.
 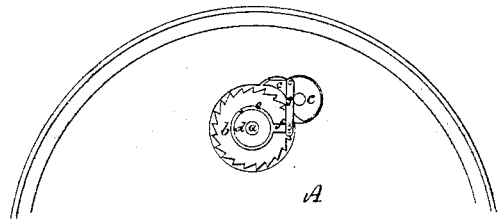 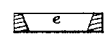
Witnesses.            Simeon C. Smith.
H. E. Boardman,      F. Curtis. Atty.
J. H. Thomas.

UNITED STATES PATENT OFFICE.

SIMEON C. SMITH, OF BOSTON, MASSACHUSETTS, ASSIGNOR OF ONE-FOURTH HIS RIGHT TO FREDERICK CURTIS, OF SAME PLACE.

IMPROVEMENT IN THE WINDING-CLICKS OF WATCHES.

Specification forming part of Letters Patent No. 138,350, dated April 29, 1873; application filed December 21, 1872.

*To all whom it may concern:*

Be it known that I, SIMEON C. SMITH, of Boston, Suffolk county, Massachusetts, have invented certain Improvements in Time-Keepers, of which the following is a specification:

Heretofore watch-makers, and more especially watch-repairers, have encountered many instances of injury to, and great wear upon, the winding ratchet-wheel and pawl, owing to the friction of the latter upon the teeth of the former and the blow of the pawl upon each tooth under the action of its spring, and the wear upon the ratchet-wheel and pawl of clocks and watches is more rapid than upon any other portion of the works. If the wheel be tempered too hard, fracture of the teeth ensues, while, if the wheel be too soft, the teeth are soon worn out, and proper tempering is a matter of great difficulty.

My present invention consists in such a combination of the winding ratchet-wheel and its intercepting pawl or other object that arrests its movement that a turn of such wheel, in the act of winding up the spring or weight, shall disengage the said wheel and pawl and allow the former to revolve without contact with the latter, while, upon cessation of the torsive power upon the wheel or its arbor, engagement of such wheel and its pawl ensues, and the former is locked in position.

The drawing accompanying this specification represents, in Figure 1, an under or inner side of the main plate of a watch with my improvement applied to the winding ratchet-wheel and pawl in one form in which such improvement may be carried into practical effect. Fig. 2 in such drawing is a similar view with the pawl disengaged from the wheel; while Fig. 3 is a section of such parts, and Figs. 4 and 5 are sections of the winding-ratchet and its sleeve, respectively.

In the drawing, A represents the main plate of a watch; $a$, its winding-arbor; $b$, its winding ratchet-wheel, and $c$ the pawl of such ratchet-wheel, such parts, *per se*, being arranged after the common manner of watches in general, with the exception that the spring usually employed to force the pawl in contact with the teeth of the wheel is omitted. In carrying out my improvement in one practical form of embodiment, I form upon or affix to the outer surface of the wheel $b$ a central stud or extension, $d$, and about this stud I encircle a sleeve or spring, $e$, which contracts about the stud with a pressure sufficient to exert a friction and to hug lightly to it, the periphery of the stud being undercut and the spring adapted to fit it, as shown in Fig. 3 of the drawing, in order to prevent endwise misplacement of said spring. To one side of the spring or sleeve $e$ I affix an arm, $f$, which extends laterally from it a short distance, and to the outer end of such arm I pivot one end of a rod or bar, $g$, the opposite end of such bar in turn being pivoted to the pawl $c$ before named.

The operation of the above-described arrangement of parts is as follows: Upon rotation of the winding-wheel, in the act of winding up the watch or clock, the sleeve $e$ clings to and moves with the wheel, by means of friction between the two, until by such movement the bar $g$, by the action of the arm $f$, has pushed the pawl $c$ away from engagement with the wheel, when the sleeve remains stationary with the pawl and allows the wheel to rotate until the winding is effected, when, upon relaxation of the power upon the wheel, the pawl immediately slips into engagement with such wheel and arrests movement of the same. As the reverse motion of the wheel, by the action of the mainspring, has the same effect upon the pawl (through the medium of the sleeve $e$, arm $f$, and rod $g$) as a spring would have, a spring may be used, but will be superfluous, as my invention enables me to dispense with it.

It will be seen that I remove the pawl from contact with the wheel while the latter is in rotation in winding up the "time-piece;" consequently, by thus doing away with the drag of the pawl upon the wheel at such time, and abolishing friction between the two, I obviate the wear and fracture which have heretofore taken place. I also abolish entirely the sound heretofore caused by the slip of the pawl upon or over the teeth of the wheel.

I do not desire to confine myself to the employment of mechanical means such as are herein shown for carrying out my invention, as these means may be varied greatly without departing from the spirit and intent of such invention, the vital feature in which is the disengagement of the wheel and pawl or intercepter in the act of winding up the mainspring or weight.

I have illustrated and explained the above mechanism as being one simple and effective manner in which, at very little expense, I can apply my improvement to watches or clocks already made, and enable others to understand and apply such improvement. In the making of new time-pieces this construction of parts would undoubtedly be varied to a greater or less extent.

In lieu of the toothed periphery upon the wheel $b$ a smooth edge may be employed, and the pawl, in the form of an eccentric or cam, be adapted to act upon it with sufficient friction to prevent a reverse rotation by the action of the mainspring; but the toothed periphery is undoubtedly the best.

*Claims.*

1. In watches and other time-keepers, the combination, with the winding-wheel and its pawl or intercepter, of mechanism whereby, during the revolution of said wheel or its arbor in winding up the watch or other timekeeper, said pawl or intercepter is positively lifted and maintained out of contact with said wheel, substantially as and for the purposes set forth.

2. In combination, the wheel $b$, sleeve $e$, pawl $c$, arm $f$, and bar $g$, substantially as and for the purposes stated.

SIMEON C. SMITH.

Witnesses:
F. CURTIS,
W. E. BOARDMAN.